United States Patent Office 3,534,612
Patented Oct. 20, 1970

3,534,612
PRESSURE DIFFERENCE TRANSDUCERS
Ernest Clifford Buckland, Upper Beeding, near Steyning, England, assignor to K.D.G. Instruments Limited
Filed Mar. 20, 1968, Ser. No. 714,745
Int. Cl. G01l 13/02
U.S. Cl. 73—398                                   3 Claims

ABSTRACT OF THE DISCLOSURE

A pressure difference transducer includes respective deformable enclosures each in a chamber to which one pressure is applied. The enclosures are coupled by a conduit to form a sealed system filled with liquid. Transducers coupled to the respective enclosures develop electrical signals representative of their deformation. The difference between the electrical signals represents the pressure difference.

---

This invention relates to pressure difference transducer means, that is, to means for developing an electrical signal of which a characteristic varies in accordance with the difference between two applied fluid pressures, irrespective within wide limits of their absolute magnitudes.

Conventional pressure difference transducers have included a pressure-deformable enclosure having one pressure applied to its interior and the other to its exterior, so that deformation of the enclosure related to the pressure difference is produced and is used to actuate a transducer device yielding an electrical signal related to the enclosure deformation and thus to the pressure difference. Such a device can withstand only a limited pressure difference without damage and should rupture of the deformable enclosure occur the high-pressure system is put directly into communication with the low-pressure system. Moreover, high pressures applied to a system of this kind produce structural deformations which deleteriously affect the accuracy of the relation between the pressure difference and the evolved signal.

Another type of pressure difference transducer formerly employed includes separate pressure-deformable enclosures each having one of the pressures of which the difference is to be measured applied to it, and the two enclosures together with a connecting conduit constituting a sealed system filled with a liquid. In this known device a transducer coupled to one of the deformable enclosures provides a signal generally related to the differences in the pressures applied to the two chambers. This known arrangement suffers from the disadvantage that the fluid in the sealed system is compressible, so that when the applied pressures are both high a shift in the zero of the measurement occurs with resultant inaccuracy in the pressure-difference measurement.

A further disadvantage is that any expansion of the fluid in the sealed system due to increase in temperature produces a corresponding zero shift.

It is an object of the invention to provide improved pressure difference transducer means for responding to pressure differentials.

A further object of the invention is to provide pressure difference transducer means having a high sensitivity to pressure differentials even when subject to high absolute pressures.

Another object of the invention is to provide pressure difference transducer means wherein zero error due to the compressibility of a fluid contained in a sealed fluid system may be reduced.

It is an additional object of the invention to provide pressure difference transducer means wherein the effects of temperature changes of the transducer means may be compensated.

Pressure difference transducer means in accordance with the invention may in one embodiment comprise container means defining first and second pressure chambers. In each pressure chamber is a respective pressure-deformable enclosure means. The two enclosure means are connected by a conduit. The conduit and the enclosures are filled with liquid to constitute a sealed liquid system. Further conduit means are provided for applying first and second fluid pressures each to a respective one of said pressure chambers. An individual transducer means is coupled to each of said enclosures to yield respective first and second electrical signals individually representative of the deformation of a said enclosure. The difference between the electrical signals thus represents a measure of the difference between said pressures.

The features of the invention which are believed to be novel are recited with particularity in the appended claims. The invention, together with further features and advantages thereof is best understood from the following description taken in conjunction with the drawings, of which:

Figure 1:
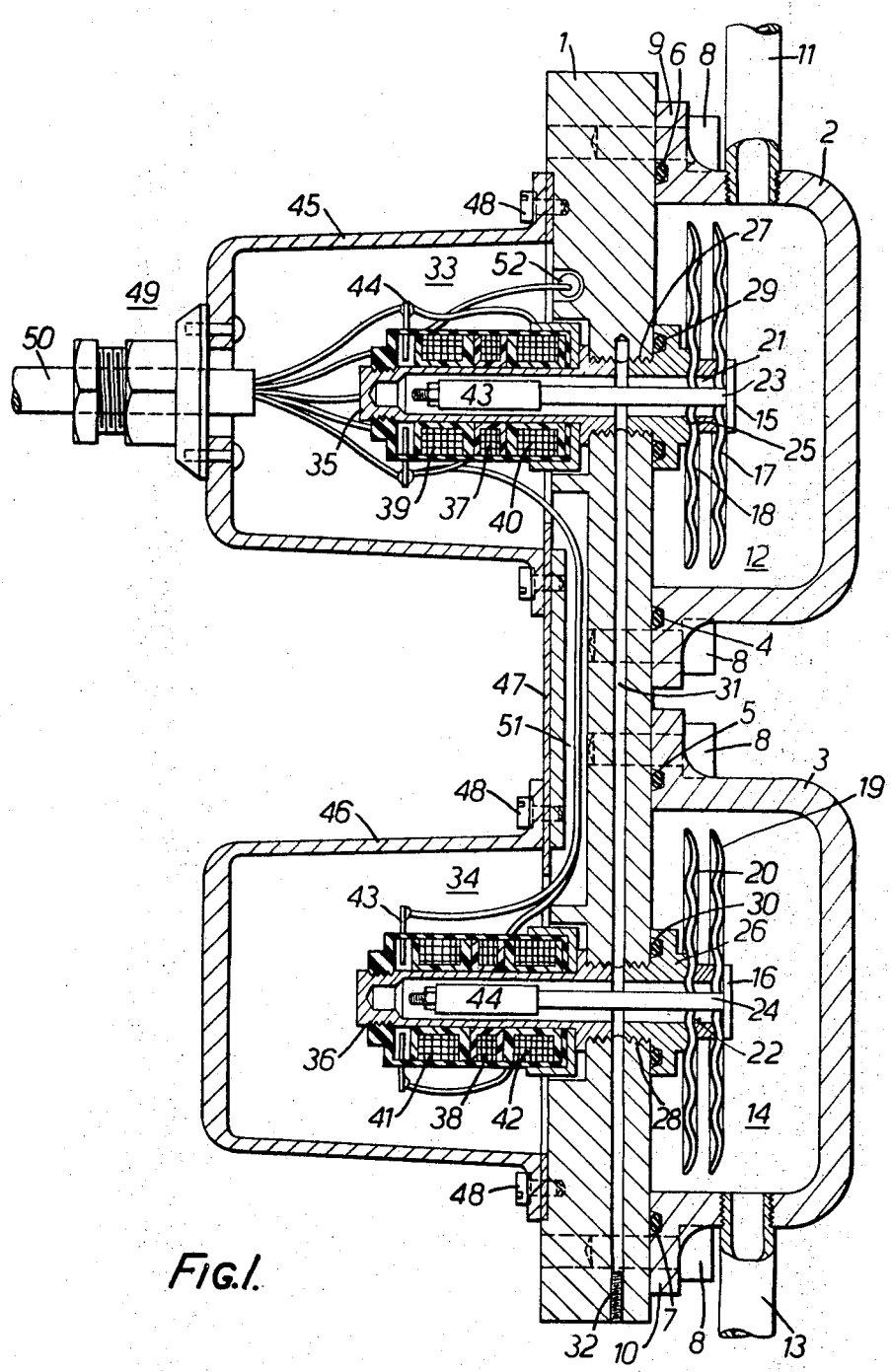
FIG. 1 shows a sectional elevation of one embodiment of pressure difference transducer means incorporating the invention.

The embodiment of pressure difference tranducer means shown in FIG. 1 includes a metal baseplate 1. To spaced portions of baseplate 1 are applied repsective doomed cover members 2, 3 which are hermetically sealed to plate 1 by suitable means such as O-rings 4, 5 fitted in grooves 6, 7 formed respectively in the faces of cover members 2, 3. Cover members 2, 3 are secured to baseplate 1 by suitable means, for example by screws 8 passing through holes in flanged portions 9, 10 of cover members 2, 3 and engaged in taped holes in baseplate 1. Cover member 2 includes a tapped hole into which is screwed a pipe 11 by which a first fluid pressure is applied to the pressure chamber 12 formed between cover member 2 and baseplate 1, while cover member 3 is similarly provided with a pipe 13 by which a second fluid pressure is applied to pressure chamber 14 formed between cover member 3 and baseplate 1.

Within each of pressure chambers 12, 14 is positioned a respective pressure-deformable enclosure, constiuted in this embodiment by one of pressure capsule stacks denoted generally by references 15, 16. Capsule stacks 15, 16 are conveniently identical and are preferably of the nesting kind in which complete collapse of each capsule under high applied pressure does not result in damage because the opposed capsule discs are formed with complementarily curved corrugations. The two stacks consist respectively of two capsules 17, 18 and 19, 20. The interiors of the two capsules forming each of the two stacks are interconnected by way of a respective central passageway 21, 22 through each of which passes a respective actuator rod 23, 24. Capsules 18, 20 are provided with screw-threaded mounting bushes 25, 26 which are screwed into tapped holes 27, 28 in baseplate 1 and are sealed to the baseplate by O-rings 29, 30 held in grooves in the bushes. Mounting holes 27, 28 in baseplate 1 are interconnected by a passageway 31. This passageway may be formed by drilling from the margin of the baseplate and the end may be closed by a screw-threaded plug 32. The interiors of the capsule stacks and the interconnecting passageway are filled with liquid with each stack in its half-compressed condititon to constitute a sealed liquid system which any pressure applied to one stack is transferred to the interior of the other. Thus deformation of the capsules will represent the difference between the pressures applied in chambers 12, 14.

In each of holes 27, 28 is also mounted on the side of baseplate 1 remote from the pressure chambers 2, 3 a respective transducer 33, 34. Each transducer includes a closed non-magnetic tube 35, 36 which screws into the respective mounting hole 27, 28 to form a part of the sealed liquid system. Upon each of tubes 35, 36 is disposed a symmetrical assembly of coils, a central primary coil 37, 38 being flanked by identical secondary coils 39, 40 and 41, 42. The secondary coils are connected in opposition so that when a ferromagnetic core, 43, 44 carried by actuator rod 23, 24 within tube 35, 36, is disposed symmetrically with respect to primary coil 37, 38 the voltages induced in the secondary coils will be alike and the voltage appearing on the opposedly-connected coils will be zero. As the core is displaced to one side or other of its symmetrical position the secondary voltage of the transducer will increase progressively in magnitude with a phase relative to that on the primary winding which will reverse with the direction of displacement of the core.

Transducer assemblies 33, 34 are provided with terminal members such as 44, by which connection is made to the primary and secondary coils. Each transducer assembly is contained in a flanged cover 45, 46 sealed to the surface of baseplate 1 by a cork gasket 47 and secured to the baseplate by screws 48 passing through the cover flanges. Cover 48 carries a sealed cable gland 49 through which a multi-core connecting cable 50 enters the cover. The cores of cable 50 are connected to terminal members 44 of the two transducer assemblies, the leads to assembly 34 passing through a passageway 51 formed within baseplate 1.

In the surface of baseplate 1 within cover 45 is secured a temperature-sensitive resistor 52, conveniently a platinum resistor, which may be made use of to compensate for varying temperatures of the transducer assembly.

Figure 2:
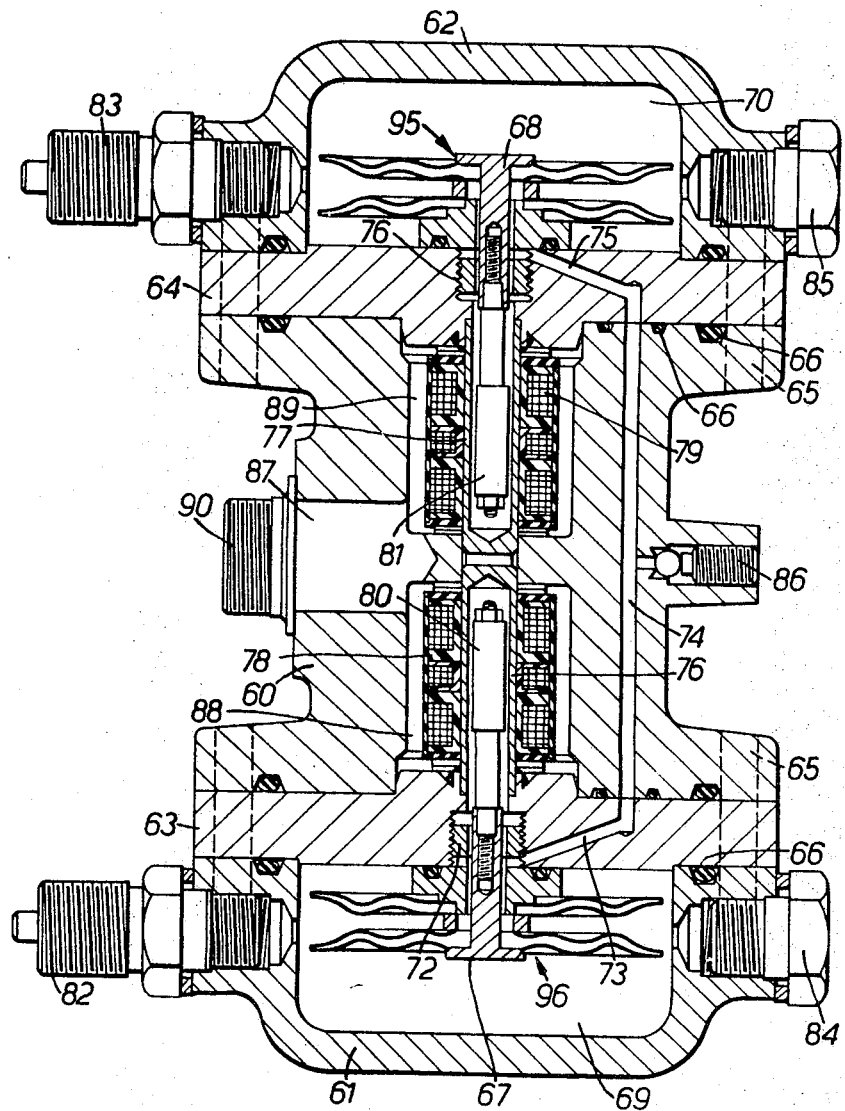
FIG. 2 shows a sectional elevation of another embodiment of pressure difference transducer means incorporating the invention.

The transducer assembly illustrated in FIG. 2 comprises a central body member 60, two cover members 61, 62 and two mounting members 63, 64. All the members are held together by bolts at positions such as 65 and sealing between adjacent faces of the members is effected by O-rings 66. Each of cover members 61, 62 with the mounting member 63, 64 to which it is secured constitutes a pressure chamber 69, 70. A pressure capsule stack 95, 96 of the nesting type is contained in each of chamber 69, 70. As in the embodiment of FIG. 1 the capsules are filled with liquid and are interconnected by passageways 73, 75 in the mounting members and a passageway 74 in the body member. Passageway 74 is provided with a screw-down ball valve 86 through which the system may be filled with liquid and then sealed to constitute a sealed pressure system. As in the embodiment described in relation to FIG. 1, each capsule stack has a central actuator rod 67, 68 which projects through a mounting bushing 72, 76 for the stack to carry a ferromagnetic core 80, 81 disposed within a non-magnetic tube 77 carrying a coil assembly 78, 79 similar to those of FIG. 1. A recess 87 formed in body member 60 communicates with recesses 88, 89 in the body member which contain transducer assemblies 77, 78 and is conveniently provided with a mouting 90 for a cable gland through which a multi-core connecting cable may be sealed into the body member when its cores have been connected to the transducers and, if such is provided, to a temperature-sensitive resistor (not shown) similar to resistor 52 of FIG. 1.

Pressure chambers 69, 70 are provided with pipe unions 82, 83 by which pressures may be applied within them and are also provided with plugs 84, 85.

Figure 3:
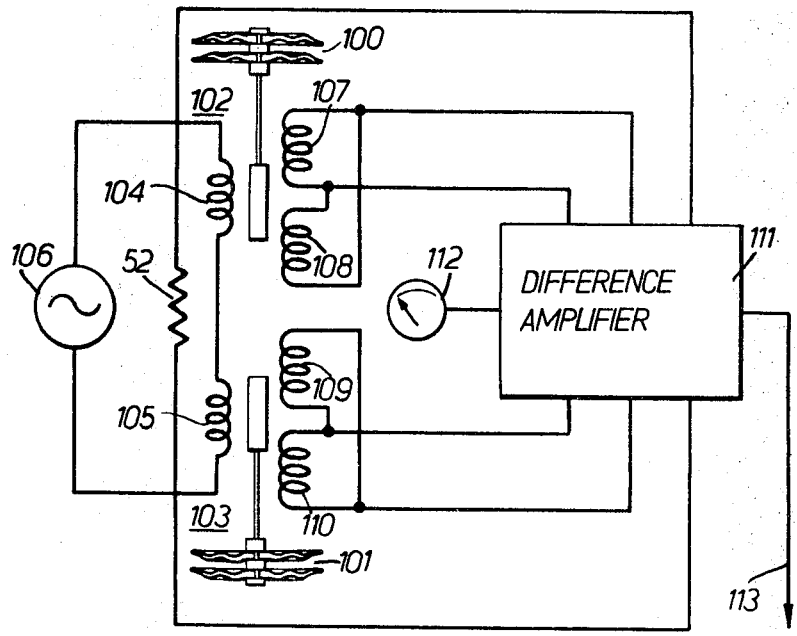
FIG. 3 is a circuit diagram showing one arrangement for measuring pressure differences by the use of transducer means incorporating the invention.

FIG. 3 shows a circuit arrangement which is advantageously used to obtain a pressure measurement or control by means of a transducer as described in relation to FIG. 1 or FIG. 2. Pressure capsule stacks 100, 101, arranged as described in relation to either of the preceding figures, actuate respective transducers 102, 103, the primary windings 104, 105 of which are connected in series and are supplied with alternating current from a conventional source 106. The parallel-connected pairs of transducer secondary windings 107, 108; 109, 110 of transducers 102, 103 are connected to respective inputs of a difference amplifier 111, the output of which is used to control an indicating meter 112 and/or to provide by way of an output lead 113 an electrical signal related to the pressure difference, which is applied to produce a desired actuation of apparatus not shown in the drawing.

The temperature-sensitive resistor 52 is connected in the circuit of amplifier 111 in such a manner as to reduce or eliminate the effects of variations of transducer temperature upon the accuracy with which the derived signal is related to the pressure difference.

While particular embodiments of the invention have been shown and described, it is apparent that changes and modifications may be made without departing from the invention in its broader aspects.

I claim:

1. Apparatus for measuring the difference in pressure between two fluid sources, comprising
    support means including a support body, and a pair of cover members connected with said body to define a pair of isolated pressure chambers adapted for communication with said fluid sources, respectively, said support body containing a pair of threaded bores in communication at one end with said chambers, respectively;
    first and second independently-operable pressure-deformable stacks of nested pressure capsules arranged within said pressure chambers, respectively;
    bush means rigidly connecting each of said pressure capsule stacks, respectively, with said support body, each of said bush means including an externally threaded tubular bush connected at one end with the associated pressure capsule stack and threadably connected at the other end within the corresponding threaded bore in said support member;
    means including the central bores of said tubular bushes and an intermediate passageway contained in said support body for connecting the interiors of said pressure capsule stacks to define a sealed system, said stacks initially being in the half-compressed condition and said system being filled with a liquid, whereby any pressure applied to one stack is transferred to the interior of the other stack and the deformation of the capsules represents the difference between the fluid pressures in said chambers, respectively; and
    first and second electrical transducer means for generating electrical signals as a function of the deformation of said pressure capsule stacks, respectively, each of said transducer means including an actuator rod connected at one end with a movable portion of said pressure capsule stack and extending axially through the tubular bush associated therewith, a ferromagnetic member carried by the other end of said rod, and differential transformer means including stationary primary and secondary coil means connected with said support means and arranged concentrically about said ferromagnetic member.

2. Apparatus as defined in claim 1, wherein said support body comprises a base plate through which said threaded bores extend, respectively;
    wherein each of said transducer means includes a tubular non-magnetic metal housing closed at one end and upon which said coil means are concentrically mounted, respectively, said tubular housing being threadably connected at its other end within said bore for axially receiving the ferromagnetic member associated therewith; and further including a pair of additional cover members cooperating in sealed relationship with said base plate to enclose said first and second transducer means, respectively, said base plate containing an additional passageway communicating at opposite ends with the chambers defined by said additional cover members, respectively; and means for energizing said first and second transducer means, comprising conductor means extending in sealed relationship through one of said additional cover members and at least partially through said additional passageway.

3. Apparatus as defined in claim 1, wherein said support body contains first and second recesses in communication with and arranged axially of said threaded bores, respectively, for receiving said first and second transducer means, respectively, said support body containing also an additional recess in communication with said first and second recesses, respectively; and further wherein said transducer means includes means for energizing said transducer coil means, comprising conductor means extending through said additional recess and at least partially within said pair of recesses, respectively; and sealing means for closing said further recess.

References Cited

UNITED STATES PATENTS

| 2,627,750 | 2/1953 | Titus | 73—410 XR |
| 3,142,794 | 7/1964 | Pegram | 73—398 XR |

FOREIGN PATENTS 771,040  3/1957  Great Britain.

DONALD O. WOODIEL, Primary Examiner

U.S. Cl. X.R.

73—407